US008712086B2

(12) United States Patent
Zurek et al.

(10) Patent No.: US 8,712,086 B2
(45) Date of Patent: Apr. 29, 2014

(54) ACOUSTIC RECONFIGURATION DEVICES AND METHODS

(75) Inventors: Robert A Zurek, Antioch, IL (US); Shaohai Chen, Libertyville, IL (US); Joel A Clark, Woodridge, IL (US); Paul R Steuer, Hawthorn Woods, IL (US); Giles Davis, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 1233 days.

(21) Appl. No.: 11/965,077

(22) Filed: Dec. 27, 2007

(65) Prior Publication Data
US 2009/0169041 A1 Jul. 2, 2009

(51) Int. Cl.
*H04R 1/20* (2006.01)
*H04R 1/02* (2006.01)
*G10K 11/16* (2006.01)
*H04R 25/00* (2006.01)

(52) U.S. Cl.
USPC ......... 381/345; 381/386; 381/71.6; 381/71.7; 381/370

(58) Field of Classification Search
USPC ............... 381/338, 386, 370, 71.6, 71.7, 309, 381/345; 181/199, 156, 155
See application file for complete search history.

(56) References Cited

U.S. PATENT DOCUMENTS

| 4,856,071 A | 8/1989 | Marquiss |
| 5,097,514 A | 3/1992 | McNeill |
| 5,286,928 A | 2/1994 | Borland |
| 6,144,751 A | 11/2000 | Velandia |
| 6,183,274 B1 | 2/2001 | Allum |
| 6,321,080 B1 | 11/2001 | Diethorn |
| 6,359,994 B1 | 3/2002 | Markow et al. |
| 6,411,720 B1 | 6/2002 | Pritchard |
| 6,634,455 B1 | 10/2003 | Yang |
| 6,636,750 B1 | 10/2003 | Zurek et al. |

(Continued)

FOREIGN PATENT DOCUMENTS

| AT | 409910 B | 4/2002 |
| CN | 1706231 A | 12/2005 |

(Continued)

OTHER PUBLICATIONS

Andrey K. Morozov, Douglas C. Webb; "A Sound Projector for Acoustic Tomography and Global Ocean Monitoring"; p. 174-185; Apr. 2003.

(Continued)

*Primary Examiner* — Elvin G Enad
*Assistant Examiner* — Ronald Hinson

(57) ABSTRACT

Disclosed is a portable audio device and a quick-disconnect passive acoustic cover. The portable audio device includes a housing and a speaker supported by the housing that have a first system frequency response. The speaker of the portable audio device has a first side and a second side associated with a first audio port and a second audio port, associated with a first acoustic load and a second acoustic load respectively. The housing is configured to removably receive the cover which is configured to redefine at least one of the first acoustic load and the second acoustic load to replace the first system frequency response with a second system frequency response. The cover provides one or more additional surrounding structures, which replace the inherent frequency response with an improved frequency response. Different embodiments of the disclosed cover provide a plurality of sound quality enhancement options to a user.

4 Claims, 9 Drawing Sheets

(56) References Cited

U.S. PATENT DOCUMENTS

| | | | |
|---|---|---|---|
| 6,758,303 B2* | 7/2004 | Zurek et al. | 181/155 |
| 7,324,655 B2* | 1/2008 | Sato | 381/370 |
| 7,400,917 B2 | 7/2008 | Wood et al. | |
| 7,961,900 B2 | 6/2011 | Zurek et al. | |
| 2001/0039200 A1 | 11/2001 | Azima et al. | |
| 2002/0009195 A1 | 1/2002 | Schon | |
| 2003/0068063 A1 | 4/2003 | Usuki et al. | |
| 2003/0096632 A1 | 5/2003 | Kim et al. | |
| 2004/0165359 A1 | 8/2004 | Cheng et al. | |
| 2005/0018868 A1 | 1/2005 | Chick et al. | |
| 2005/0031148 A1 | 2/2005 | McNary | |
| 2005/0163334 A1 | 7/2005 | Suprapmo et al. | |
| 2007/0019820 A1 | 1/2007 | Zurek et al. | |
| 2007/0025582 A1* | 2/2007 | Rashish et al. | 381/388 |
| 2007/0029131 A1 | 2/2007 | Pan et al. | |
| 2007/0189566 A1 | 8/2007 | Yamagishi et al. | |
| 2007/0223745 A1 | 9/2007 | Feng et al. | |
| 2008/0219488 A1 | 9/2008 | Crooijmans et al. | |
| 2009/0129623 A1* | 5/2009 | Weckstrom et al. | 381/386 |
| 2009/0169040 A1 | 7/2009 | Chen et al. | |
| 2011/0212754 A1 | 9/2011 | Zurek et al. | |

FOREIGN PATENT DOCUMENTS

| | | |
|---|---|---|
| FR | 2770734 A1 | 7/1999 |
| GB | 2377116 A | 12/2002 |
| JP | 2005086590 A | 3/2005 |
| JP | 2005136895 A | 5/2005 |
| JP | 2005184050 | 7/2005 |
| JP | 2005184050 A | 7/2005 |
| JP | 20065616 A1 | 1/2006 |
| JP | 3997133 B2 | 10/2007 |
| KR | 200144783 Y1 | 6/1999 |
| KR | 1020040040519 A | 5/2004 |
| KR | 200417799 Y1 | 6/2006 |
| RU | 2019063 C1 | 8/1994 |
| RU | 2237981 C2 | 10/2004 |
| WO | 2004043127 A1 | 5/2004 |
| WO | 200711650 A1 | 10/2007 |

OTHER PUBLICATIONS

Patent Cooperation Treaty, "PCT Search Report and Written Opinion of the International Searching Authority" for international Application No. PCT/US2008/087072 Jul. 28, 2009, 11 pages.

Patent Cooperation Treaty, "PCT Search Report and Written Opinion of the International Searching Authority" for International Application No. PCT/US2008/087102 Sep. 22, 2009, 11 pages.

European Patent Office, "Extended European Search Report" for Application No. 08869181.1-2225 Apr. 20, 2001, 8 pages.

Korean Itellectual Property Office, "Notice of Preliminary Rejection", Oct. 6, 2011, pp. 1-3, Korean Pat Appln. No. 10-2010-7014100.

Rospatent The Federal State Institute, "The Federal Institute for Industrial Property of the Federal Service for the Intellectual Property Patent and Trademarks", Sep. 23, 2011, 6 pages, Russian Pat. Appl. No. 201031197/28.

The Federal Service for Intellectual Property, Patents and Trademarks, "Decision on Grant Patent for Invention". Apr. 2, 2012, Russian Pat. Appln. No. 2010131197, 6 pages.

The State Intellectual Property Office of the People'S Republic of China, "Notification of the First Office Action" for Chinese Patent Application No. 200880123216.x dated Nov. 5, 2012, 17 pages.

United State Patent and Trademark Office, "Non-Final Office Action" for U.S. Appl. No. 11/965,022 Mar. 8, 2012, 23 pages.

United State Patent and Trademark Office, "Non-Final Office Action" for U.S. Appl. No. 13/103,416 Feb. 22, 2013, 7 pages.

European Patent Office, "Extended European Search Report" for Application No. 08866054.3-1910, Jul. 10, 2013, 9 pages.

* cited by examiner

ACOUSTIC RECONFIGURATION DEVICES AND METHODS

FIELD

Disclosed are devices and methods for acoustic reconfiguration of an audio device, and more particularly, devices and methods for enhancing the output frequency response of a portable audio device or mobile communication device.

BACKGROUND

The makers of portable audio devices, including those of cellular telephones and portable music devices, are increasingly adding functionality to their devices. For example, cellular telephones include features such as music playback systems, multimedia playback systems, video cameras, video streaming, two-way video calling, internet browsing, and other audio processing features. While there is a trend toward the inclusion of more features and improvements for current features, there is also a trend toward smaller portable audio devices. As the devices have become increasingly smaller, loudspeakers of the devices are smaller as well. However, speaker quality, at least in part, remains a function of size.

The desired or required size of a portable audio device may also limit the manufacturer's choices for speaker cavity size and the location of the speaker within the housing of the device. The efficiency of a loudspeaker can depend to some extent on the acoustic load placed on it by the way it couples to its surrounding structures such as the speaker cavity and/or the device housing. In electrical terms a load is something that dissipates power and does some work. In acoustic terms a load is an acoustic structure that has a particular acoustic impedance. Such an impedance may be that of radiation from an aperture into air. The frequency response of a loudspeaker system can depend upon how the system is "loaded" in much the same way that the output from a power amplifier depends on the load impedance. The power amplifier drives an electrical load specified in Ohms. A loudspeaker drives an acoustic load that may be specified in units of acoustic Ohms or Rayls. Introducing a speaker system to a particular load will produce a particular transfer function or frequency response and a sound pressure level (SPL) in decibels (dB) when the speaker is driven at a nominal input voltage or power, for example, 2.83V or 1 W input.

A portable audio device architecture typically includes a speaker or speakers that radiate sound energy out of a surface of the device. While the quality of a small speaker for use during voice telephone calls may be sufficient, a user may find using the same speaker for music and multimedia playback systems inadequate. Loudness and the bass response of a loudspeaker system of a portable audio device may be particularly lacking. Improvement of the sound quality may be desired by users who in particular use the device for music and/or multimedia playback.

DESCRIPTION

Figure 1:
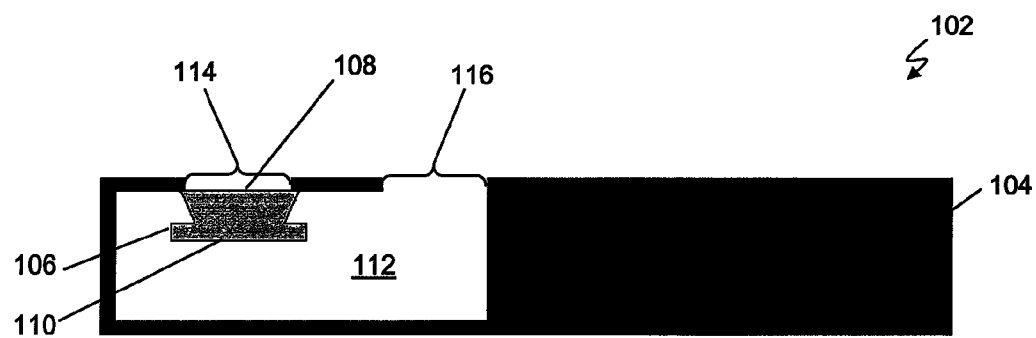
FIG. 1 depicts a side cut-away view of a portable audio device and in particular its housing, and a speaker that can be a low sound level transducer used for private conversation and/or as a loudspeaker when the device is placed in speakerphone mode.

It would be beneficial to enhance the frequency performance of a portable audio device loudspeaker sound system without increasing the size of the transducer or speaker and/or speaker cavity, or the power requirements of the sound system. Moreover, it would be beneficial to enhance the sound quality without adding any costs to the device by way of utilizing a particularly expensive speaker. It would also be beneficial to provide a plurality of sound quality enhancement options to a user depending on their sound needs.

Disclosed is a quick-disconnect passive acoustic cover, a portable audio device and acoustic cover combination and method for replacing the frequency response of a speaker housed by a portable audio device housing with a different frequency response by attaching a quick-disconnect passive acoustic cover to the portable audio device. In this way, the separate removable cover replaces the original cover of the device, and augments the device's sound system by adding additional acoustic volumes and ports to the rear and in some cases to the front of the speaker or transducer. Many different embodiments of the disclosed quick-disconnect passive acoustic cover are described in detail below. Each embodiment may provide a different frequency response from the others. An advantage of many embodiments is that a user may have a choice in which embodiment to utilize depending upon their sound quality preference.

As discussed above, while the quality of a small speaker in a small acoustic volume for use during voice telephone calls may be sufficient, a user may find using the same speaker for music and multimedia playback systems inadequate. Loudness and/or the bass response of a typical loudspeaker system of a mobile communication device may be particularly lacking. According to the disclosed acoustic cover and method, a portable audio device can be configured to removably receive a disclosed quick-disconnect passive acoustic cover. By replacing the disclosed standard cover of the portable audio device with another disclosed quick-disconnect passive acoustic cover, the frequency response of the speaker, or loudspeaker of a portable audio device may be enhanced by an improved frequency response. In this way, a user may find the audio output of the device/cover combination better for music and other multimedia playback.

More particularly, disclosed is a portable audio device including a housing and a speaker supported by the housing wherein the speaker and housing having a first system frequency response. The speaker has a first side and a second side associated with a first acoustic load and a second acoustic load. The housing is configured to removably receive a quick-disconnect passive acoustic cover which is configured to redefine at least one of the first acoustic load and the second acoustic load so as to replace the first system frequency response with a second system frequency response. That is, the quick-disconnect passive acoustic cover beneficially enhances the efficiency of a loudspeaker, which as mentioned above depends to some extent on the acoustic load placed on it by the way it is coupled to its surrounding structures such as the speaker cavity and/or the device housing. The disclosed quick-disconnect passive acoustic cover provides one or more additional surrounding structures which in the disclosed configurations, enhance the frequency response of the device speaker with an improved frequency response. A disclosed quick-disconnect passive acoustic cover may be easily removed and replaced, providing easy access to sound quality options to the user.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

FIG. 1 depicts a side cut-away view of a portable audio device 102 and in particular its housing 104, and a speaker 106 that can be a low sound level transducer or receiver used for private conversation and/or as a loudspeaker when the device 102 is placed in speakerphone mode. The speaker 106 may be supported or carried by the housing 104, and in particular in a speaker cavity 112. The speaker includes two sides, a first side 108 that can radiate sound energy out of a surface of the housing 104 of the device 102 and a second side of the speaker 110 that may radiate into the housing, and more particularly into the speaker cavity 112. A first audio port 114 of the housing 104 is proximal to the first side 108 of the speaker 106, and a second audio port 116 is proximal the second side 110 of the speaker 106. The first audio port 114 has a first acoustic load (in this case radiation into air) and the second audio port 116 has a second acoustic load. As mentioned above, the efficiency of a loudspeaker and/or the frequency response of the device can depend to some extent on the acoustic load placed on it by the way it couples to its surrounding structures such as the speaker cavity and/or the device housing.

The portable audio device 102 may be implemented as a cellular telephone (also called a mobile phone). The portable audio device 102 represents a wide variety of devices that have been developed for use within various communication networks. Such handheld communication devices include, for example, cellular telephones, messaging devices, personal digital assistants (PDAs), notebook or laptop computers, mobile data terminals, application specific gaming devices, video gaming devices, portable music players, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

As mentioned, the speaker 106 includes two sides, a first side 108 that can radiate sound energy out of a surface of the housing 104 of the device 102 at the first audio port 114 and a second side 110 of the speaker that may radiate into the housing 104, and more particularly into the speaker cavity 112. The described portable audio device 102 includes the second audio port 116 which may be utilized by particular embodiments of the disclosed quick-disconnect passive acoustic cover (see FIG. 2). The second audio port 116 may provide more tunability of the frequency response of the device 102 than were the device to include a single audio port. It is understood that two or more audio ports are within the scope of this discussion.

Figure 2:
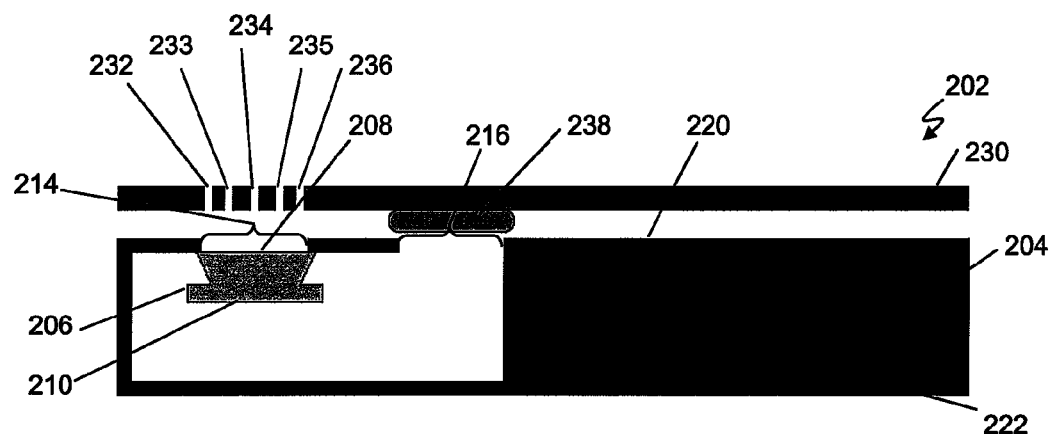
FIG. 2 depicts a side cut-away view of a portable audio device and in particular its housing, and a speaker and an embodiment of the disclosed quick-disconnect passive acoustic cover.

FIG. 2 depicts a side cut-away view of a portable audio device 202 and in particular its housing 204, and a speaker 206 and an embodiment of the disclosed quick-disconnect passive acoustic cover 230. The surface 220 may be the front surface of the device 202 or may be the back surface of the device 202. Alternatively, the surface 222 may be the front surface of the device 202 or may be the back surface of the device 202. The cover 230 is depicted unattached to the device 202 to a surface 222 of the device. As a standard cover, the cover 230 may include at least one channel 232 or a plurality of channels 232, 233, 234, 235, and 236, or any suitable number of channels. When the cover 230 is not attached to the housing, the first audio port 214 of the housing 204 that is proximal to the first side 208 of the speaker 206, and a second audio port 216 proximal the second side 210 of the speaker 206, the first audio port 214 has a first acoustic load and the second audio port 216 has a second acoustic load. The audio ports 214 and 216 may reside on different surfaces of the housing 204, and the cover 230 may overlap more than one surface of the housing 204. As a standard cover 230, the cover may also include a plug or seal 238 configured to seal at least one of the first audio port 214 and the second audio port 216. In the depicted embodiment, the plug or seal 238 may be used to seal the second audio port 216.

Figure 3:
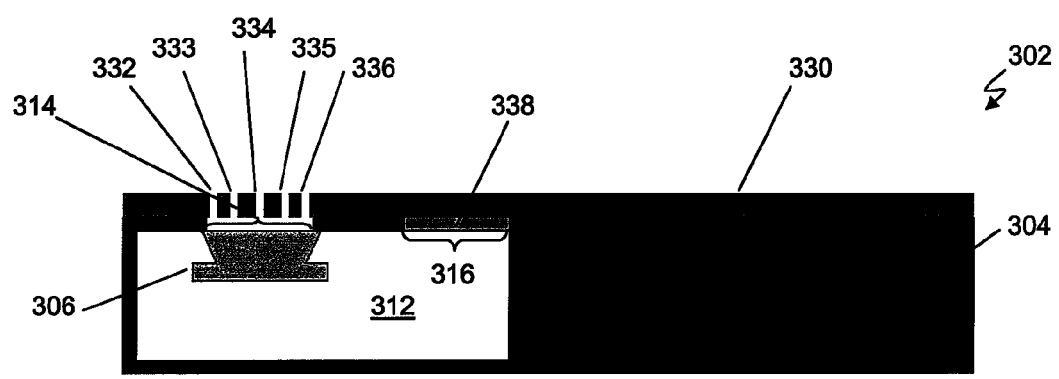
FIG. 3 depicts a side cut-away view of a portable audio device and in particular its housing, a speaker and the same or similar embodiment of the disclosed quick-disconnect passive acoustic cover of FIG. 2 removably received by the housing.

FIG. 3 depicts a side cut-away view of a portable audio device 302 and in particular its housing 304, a speaker 306, and the same or similar embodiment of the disclosed quick-disconnect passive acoustic cover of 330 of FIG. 2 removably received by the housing 304. As mentioned above, the efficiency of a speaker and/or the frequency response of the device 102 can depend to some extent on the acoustic load placed on it by the way it couples to its surrounding structures such as the speaker cavity 312 and/or the device housing 304. The depicted embodiment shows a channel 332 configured to be coupled to at least one of the first audio port 314 and the second audio port 316 of the device housing 304. That is, at least one channel 332 or a plurality of channels 332, 333, 334, 335, and 336, or any suitable number of channels, may extend the length of the first audio port 314. Also depicted is a plug or seal 338 that may be used to seal, for example, the second audio port 316, redefining the load or loads of at least one of the first acoustic load and the second acoustic load so as to replace the original system frequency response of the device 302 (without the cover 330 removably received by the housing 304) with a second system frequency response. Accordingly, cover 330 in its default configuration, as an original cover, may allow the sound signal from the front of the speaker to radiate from the first audio port 314 and block a passage, that is, audio port 316 emanating from the rear of the speaker to form an acoustic suspension system with a usable bandwidth and a small overall product size.

The disclosed device 302 is according configured to attach a removably attachable quick-disconnect passive acoustic cover 330 to the housing 304 of the portable audio device 302 and with one or more channels 332. The cover 330 may direct output of the speaker 306 and the housing system including the housing 304 and/or the housing cavity 312 into a first acoustic input port 314 of the cover 330 structure to generate and acoustic output different than that of the device 302 without the cover 330 and thus enhance the frequency response of the device 302. The cover 330 may be removably attachable to the front of the device, in which case it may include apertures for a keypad and/or display screen. Alternatively the cover 330 may be removably attachable to the back of the device 302. The requirements of the device may dictate in which direction the speaker faces, toward the front of the device 302 or the back of the device 302. It is also understood that the device 302 may include more than one speaker, and that an embodiment of the cover 330 may be configured to process sound from more than one speaker. It is also understood that cover 330 may be removably attachable to more than one surface of the device 302.

Figure 4:
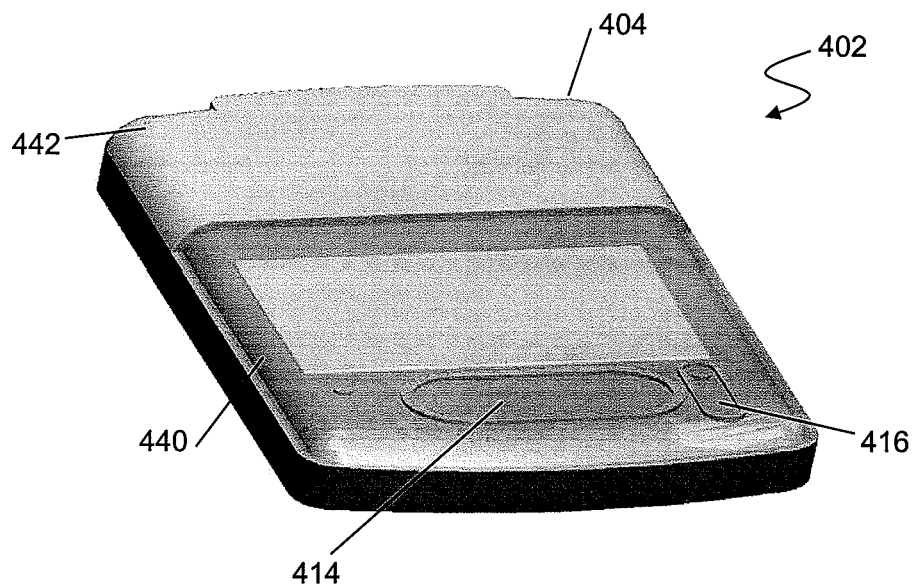
FIG. 4 depicts a portable audio device with its housing including a standard battery cover on its back side and a first loudspeaker audio port and a second loudspeaker audio port.

FIG. 4 depicts a portable audio device 402 with its housing 404 including a standard cover 440 on its back side 442 and a first loudspeaker audio port 414 and a second loudspeaker audio port 416. Standard cover 440 in this embodiment also serves as a battery cover and is the equivalent of covers 230 and 330 in FIGS. 2 and 3. In the depicted portable audio device 402, the standard battery cover 440 may be replaced by a cover, for example cover 230 (see FIG. 2). It is understood that the first audio port 414 and the second audio port 416 may be of any suitable size and configuration, and may be placed in any suitable location on the housing 404. As mentioned above, many different embodiments of the disclosed quick-disconnect passive acoustic cover 230 are described in detail below. Each embodiment may provide a different frequency response from the others. An advantage of many embodiments is that a user may have a choice in which embodiment to utilize depending upon their sound quality preference. It is understood that this discussion is intended to include any and all different embodiments of a disclosed quick-disconnect passive acoustic cover may be implemented.

Figure 5:
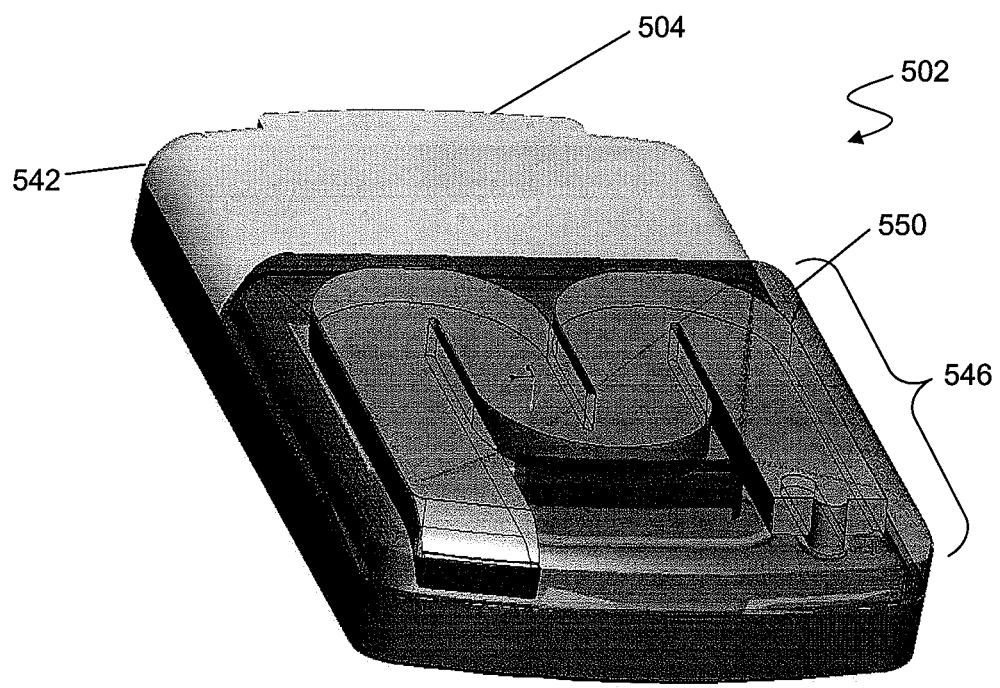
FIG. 5 depicts a portable audio device with its housing including a back side, and its battery cover (see FIG. 4) replaced by an embodiment of the disclosed quick-disconnect passive acoustic cover.

FIG. 5 depicts a portable audio device 502 with its housing 504 including a back side 542, and its standard cover 440 (FIG. 4) replaced by an embodiment of the disclosed quick-disconnect passive acoustic cover 550. The illustrated cover 550 embodiment is coupled to either or both the first loudspeaker audio port 414 and the second loudspeaker audio port 416. The illustrated cover 550 includes a transmission line 546 embodiment that can snake through the cover 550 to extend the length of either or both the first loudspeaker audio port 414 and a second loudspeaker audio port 416 to increase the low end frequency response of the device 502. The original frequency response of the loudspeaker 306 (see FIG. 3) transmitted from either or both the first loudspeaker audio port 414 and a second loudspeaker audio port 416, is replaced by a new frequency response now emanating from the cover 550. The use of cover 550 produces a first acoustic output from channel 532 and a second acoustic output from aperture 558. That is, combining the first acoustic output and the second acoustic output of the cover 550 forms a combined output so that the combined output of the system has a new or second frequency response that differs from the original or the first frequency response of the speaker 306 and housing 504. A transmission line embodiment of a cover 550 is discussed in more detail below. It is understood the cover 550 may be on the front of the device 502 or the back side of the device 502, or in any other suitable position to couple to a first speaker output port 414 and/or a second speaker output port 416 which may be in any suitable position.

Figure 6:
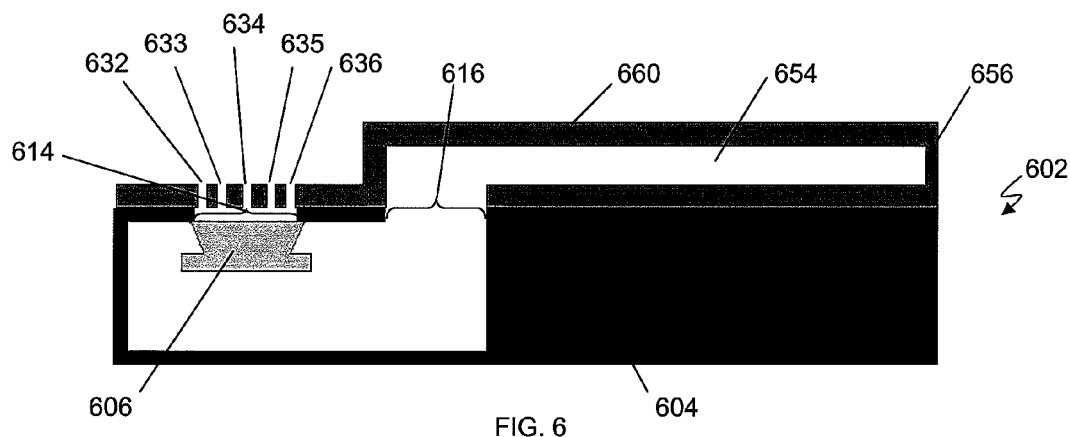
FIG. 6 depicts a side cut-away view of a portable audio device and in particular its housing, a speaker, and another embodiment of the disclosed quick-disconnect passive acoustic cover removably received by the housing in an acoustic suspension configuration.

FIG. 6 depicts a side cut-away view of a portable audio device 602 and in particular its housing 604, a speaker 606, and another embodiment of the disclosed quick-disconnect passive acoustic cover 660 removably received by the housing 604 in an acoustic suspension configuration. The cover 660 includes a volume 654 for a wideband acoustic suspension system. The quick-disconnect passive acoustic cover 660 may define a sealed volume 654 having a sealed end 656 remote from at least one of the first audio port 614 and the second audio port 616 of the device housing 604. The sealed volume 654 may be configured to be coupled to at least one of the first audio port 614 and the second audio port 616 of the device housing 604. Additionally, for example, channels 632, 633, 634, 635, and 636 may be coupled to the first audio port 614. As mentioned above, many different embodiments of the disclosed quick-disconnect passive acoustic cover 660 are described in detail below. Each embodiment may provide a different frequency response from the others. That is, any of several bandpass configurations individually or simultaneously may be applied to front and/or back side of the speaker 606.

Figure 7:
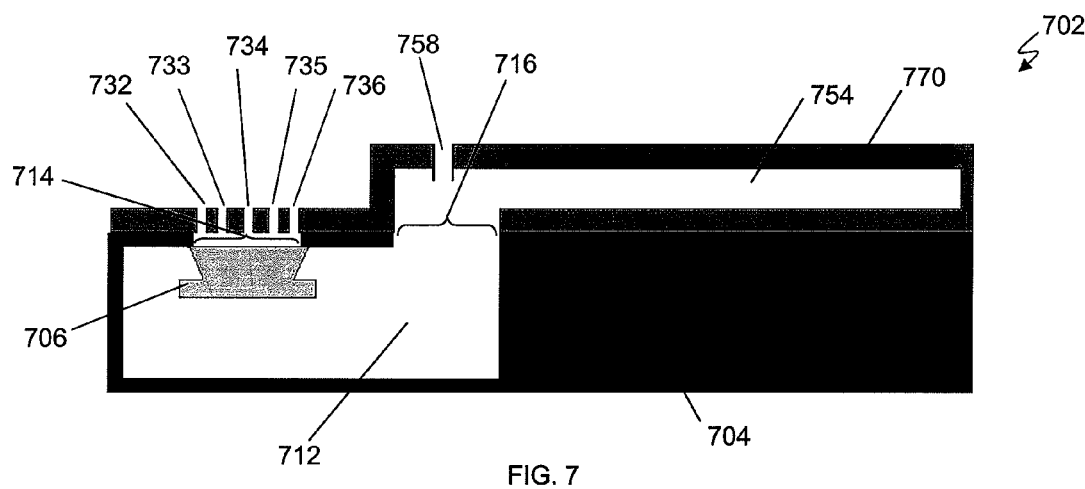
FIG. 7 depicts a side cut-away view of a portable audio device and in particular its housing, a speaker, and still another embodiment of the disclosed quick-disconnect passive acoustic cover removably received by the housing in a bass reflex configuration.

FIG. 7 depicts a side cut-away view of a portable audio device 702 and in particular its housing 704, a speaker 706, and still another embodiment of the disclosed quick-disconnect passive acoustic cover 770 removably received by the housing 704 in a bass reflex configuration. In the embodiment of FIG. 7, the cover 770 is a bass reflex cover, the audio port 714 being coupled to a plurality of channels 732, 733, 734, 735, and 736, and the audio port 716 being coupled to a volume 754. At least one aperture 758 may be remote from at least one of the first audio port 714 and/or the second audio port 716 of the device housing 704 to define, for example, a Helmholtz resonator configured to be coupled to at least one of the first audio port 714 and/or the second audio port 716 of the device housing 704. In this embodiment, if the user prefers a bass reflex improvement over the sound quality of the device without the cover 770, an advantage of many embodiments, some of which are described here, is that a user may have a choice in which embodiment to utilize depending upon their sound quality preference. One specific embodiment of cover 770 would have a special volume 754 of zero. This would form a Helmholtz resonator with the port formed by aperture 758 and the acoustic volume in speaker cavity 712.

Figure 8:
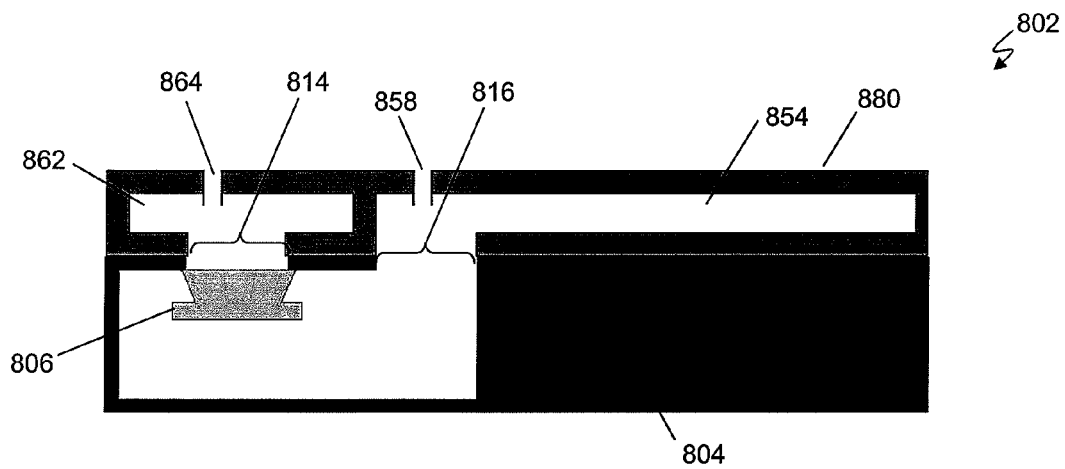
FIG. 8 depicts a side cut-away view of a portable audio device and in particular its housing, a speaker, and yet another embodiment of the disclosed quick-disconnect passive acoustic cover removably received by the housing in a band pass configuration.

FIG. 8 depicts a side cut-away view of a portable audio device 802 and in particular its housing 804, a speaker 806, and yet another embodiment of the disclosed quick-disconnect passive acoustic cover 880 removably received by the housing 804 in a band pass configuration. In this embodiment, the cover 880 creates a bandpass system. In this embodiment, the audio port 814 is coupled to a volume 862 including an aperture 864 and the audio port 816 is coupled to a volume 854 including an aperture 858. In this way, two Helmholtz resonators are configured to be coupled to the first audio port 814 and the second audio port 816 of the device housing 804, producing a different frequency response than the embodiment of FIG. 7. According, a user may have a choice in which embodiment to utilize depending upon their sound quality preference. It is understood that bandpass implementations of cover 880 could consist of two bass reflex sections as shown in FIG. 8, or of one bass reflex section and one acoustic suspension section, or of two sections that are coupled via an additional aperture between the volumes 854 and 862.

Figure 9:
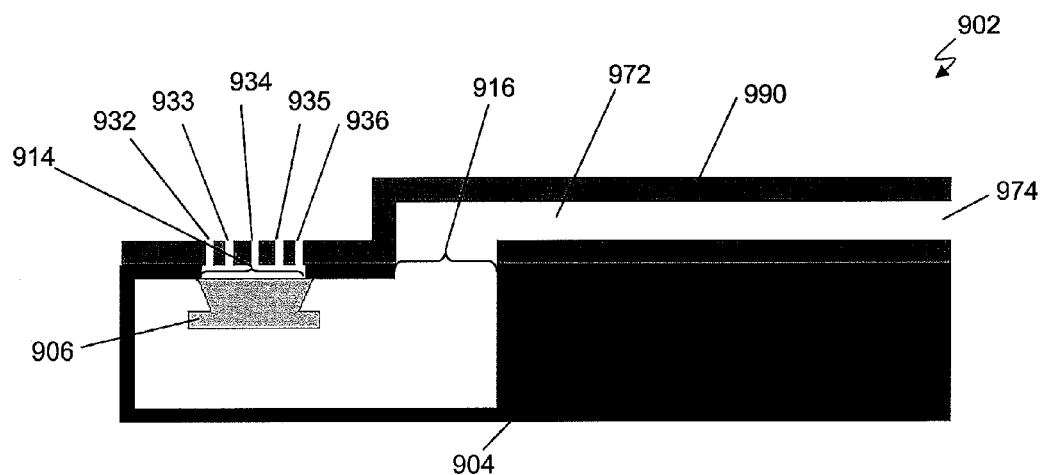
FIG. 9 depicts a side cut-away view of a portable audio device and in particular its housing, a speaker, and an embodiment similar to that of FIG. 5 of the disclosed quick-disconnect passive acoustic cover removably received by the housing in an acoustic transmission line configuration.

FIG. 9 depicts a side cut-away view of a portable audio device 902 and in particular its housing 904, a speaker 906, and an embodiment similar to that of FIG. 5 of the disclosed quick-disconnect passive acoustic cover 990 removably received by the housing 904 in an acoustic transmission line configuration. A duct-shaped volume 972 including an open end 974 is configured to be coupled to at least one of the first audio port 914 and/or the second audio port 916 of the device housing 904 to form a transmission line tuned to a particular frequency. The cover 990 is similar to the transmission line embodiment of FIG. 5, where cover 550 includes a transmission line 546 embodiment that can snake through the cover 550 to extend the length of either or both the first loudspeaker audio port 414 (see FIG. 4) and a second loudspeaker audio port 416 to increase the low end frequency response of the device 502. Again, channels 932, 933, 934, 935, and 936 are depicted coupled to the first audio port 914. It is understood that any combination of channel configurations may be utilized in the disclosed quick-disconnect passive acoustic cover to provide any number of frequency response enhancements.

The dimensions of the disclosed quick-disconnect passive acoustic cover may vary depending upon the configuration. The disclosed quick-disconnect passive acoustic cover may add for example, 4 mm to the thickness of a device 902. The disclosed quick-disconnect passive acoustic cover may be composed of any suitable material such as polycarbonate, acrylonitrile butadiene styrene (ABS), or aluminum. It may be configured to snap into position on a device 102 (see FIG. 1) where the housing 104 includes, for example, ridges to receive the disclosed quick-disconnect passive acoustic cover. Removing the disclosed quick-disconnect passive acoustic cover may include, for example, sliding the cover off the housing. It is understood that any suitable matter of removably attaching the cover and removing the cover from the housing is within the scope of this discussion.

Figure 10:
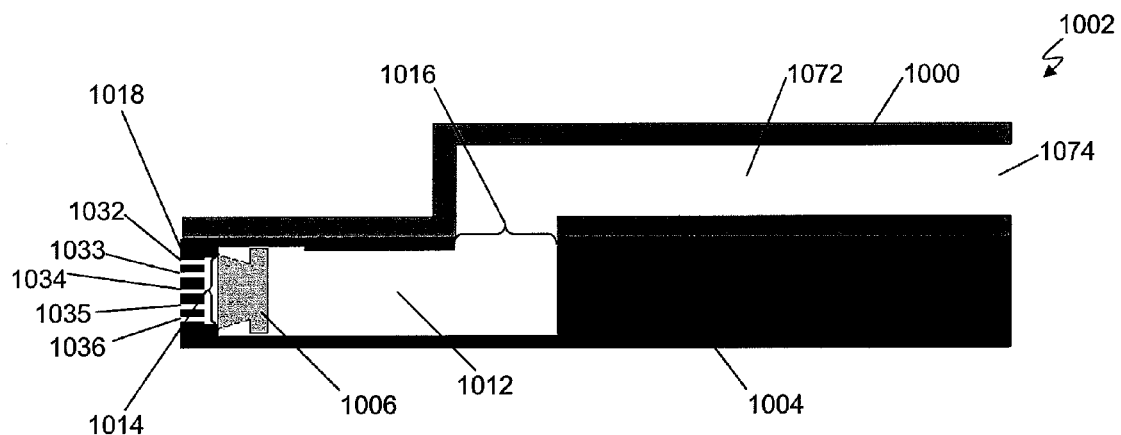
FIG. 10 depicts another embodiment of the disclosed quick-disconnect passive acoustic cover removably received by the housing where a side cut-away view of a portable audio device and in particular its housing, shows a speaker at an end of the device housing with a matched cross section at the housing/cover interface.

FIG. 10 depicts another embodiment of the disclosed quick-disconnect passive acoustic cover 1000 removably received by the housing 1004 where a side cut-away view of a portable audio device 1002 and in particular its housing 1004, shows a speaker 1006 at an end 1018 of the device housing 1004 with a matched cross section at the housing/cover interface. The end 1018 may also be referred to herein as an end surface. As mentioned, the positions of the first audio port 1014 and the second audio port 1016 may be in any suitable location. In this embodiment, the first audio port 1014 is proximal the speaker 1006 at the end 1018 of the device housing 1014. Also shown are channels 1032, 1033, 1034, 1035, and 1036 proximal the first audio port 1014 at the proximal the end 1018 of the device housing 1014. Similar to the embodiments of FIGS. 5 and 9, a duct-shaped volume 1072 including an open end 1074 is configured to be coupled to at least one of the first audio port 1014 and/or the second audio port 1016 of the device housing 1004 to form a transmission line tuned to a particular frequency. In this embodiment, housing cavity 1012, when coupled to duct-shaped volume 1072 via second audio port 1016, is configured as a duct with continuous cross section identical to that of duct-shaped volume 1072. Housing cavity 1012 thereby becomes an extension of duct-shaped volume 1072, thereby extending the usable length of duct-shaped volume 1072 as an acoustic transmission line, and enabling a lower tuning frequency than would otherwise be possible due to the length of duct-shaped volume 1072 by itself. Additionally, the combination of housing cavity 1012 and duct-shaped volume 1072 can be a constantly varying taper that continues a defined transition throughout the combined length.

Figure 11A:
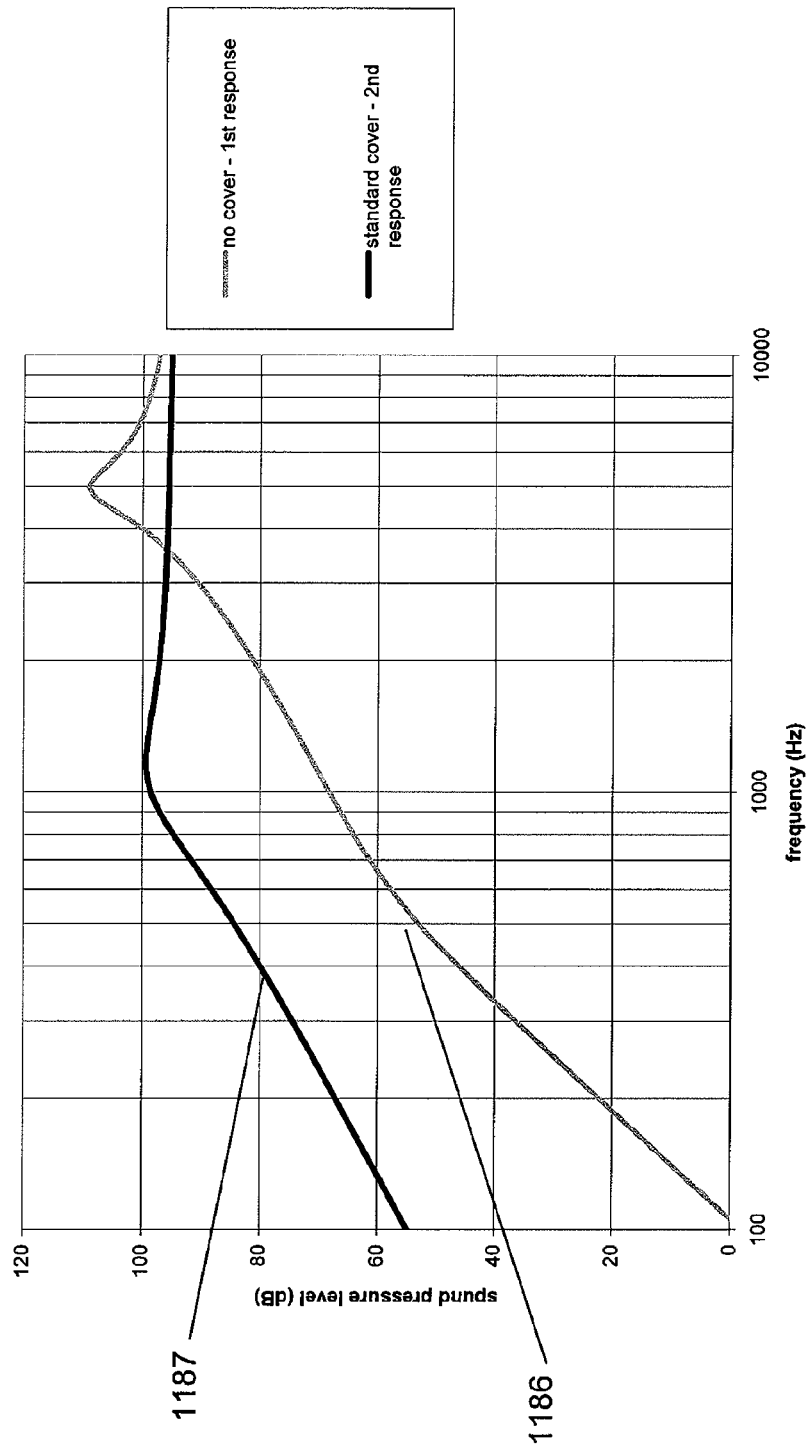
FIGS. 11a-11e are a series of graphs where the x-axis is calibrated in frequency in Hertz (Hz), and the y-axis is calibrated in sound pressure level in dB (dBSPL), that illustrate bandwidth and/or efficiency improvements for each of the disclosed quick-disconnect passive acoustic covers.
Figure 11B:
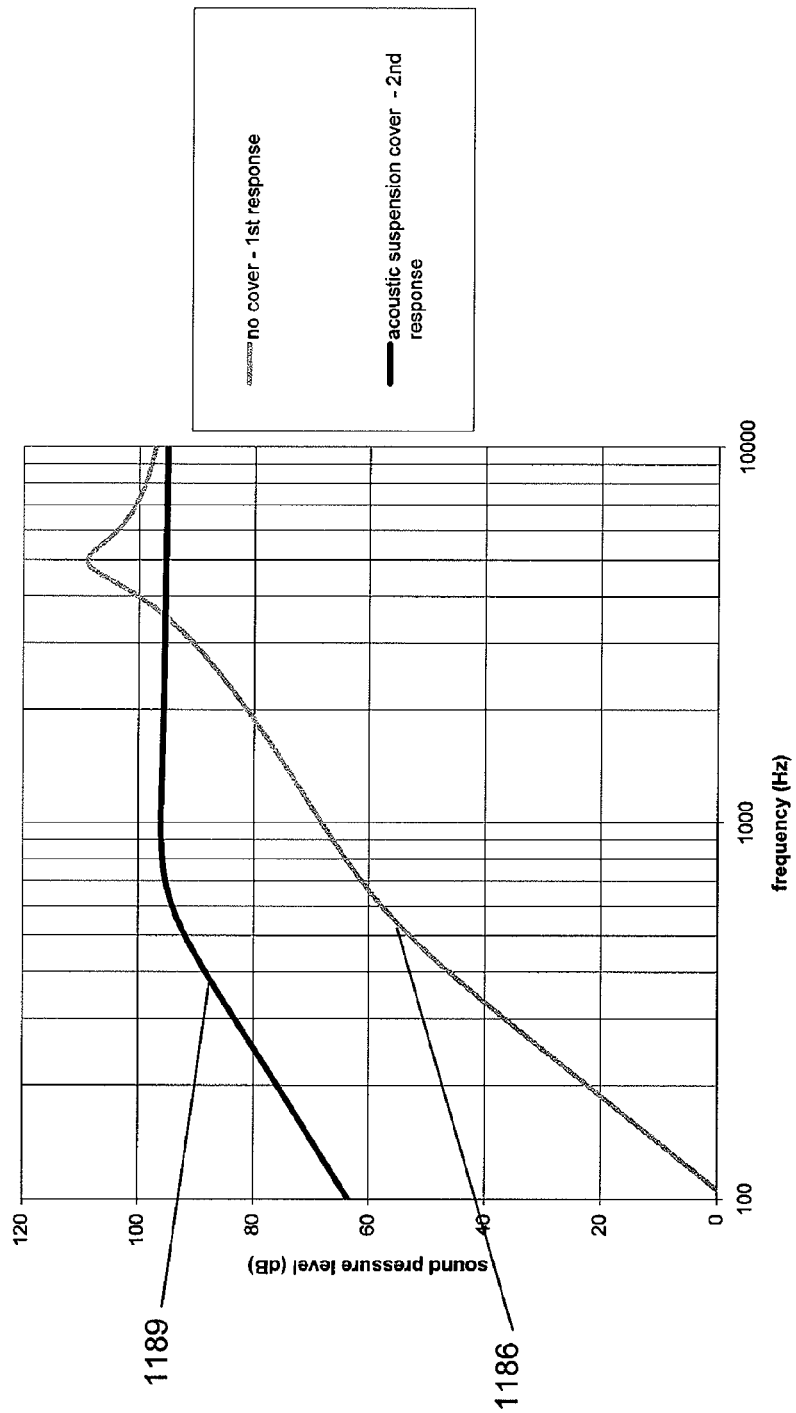
Figure 11C:
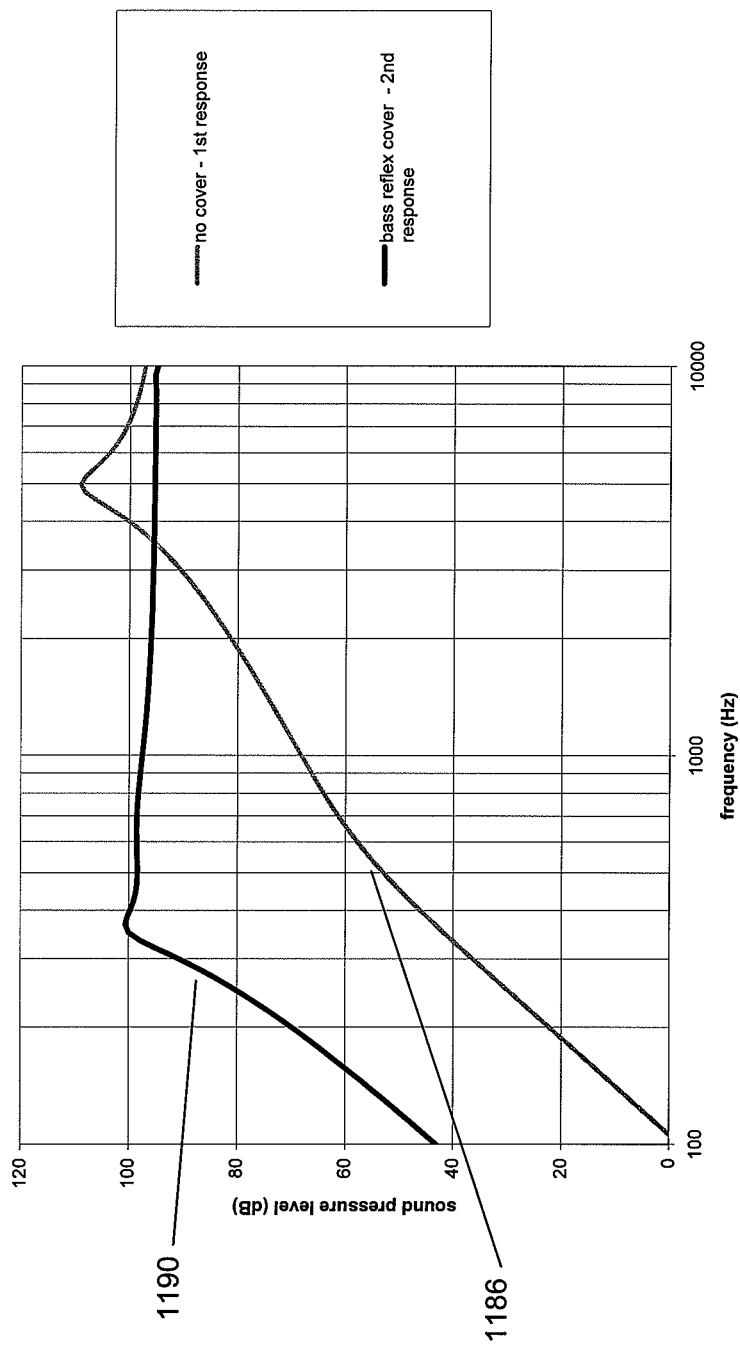
Figure 11D:
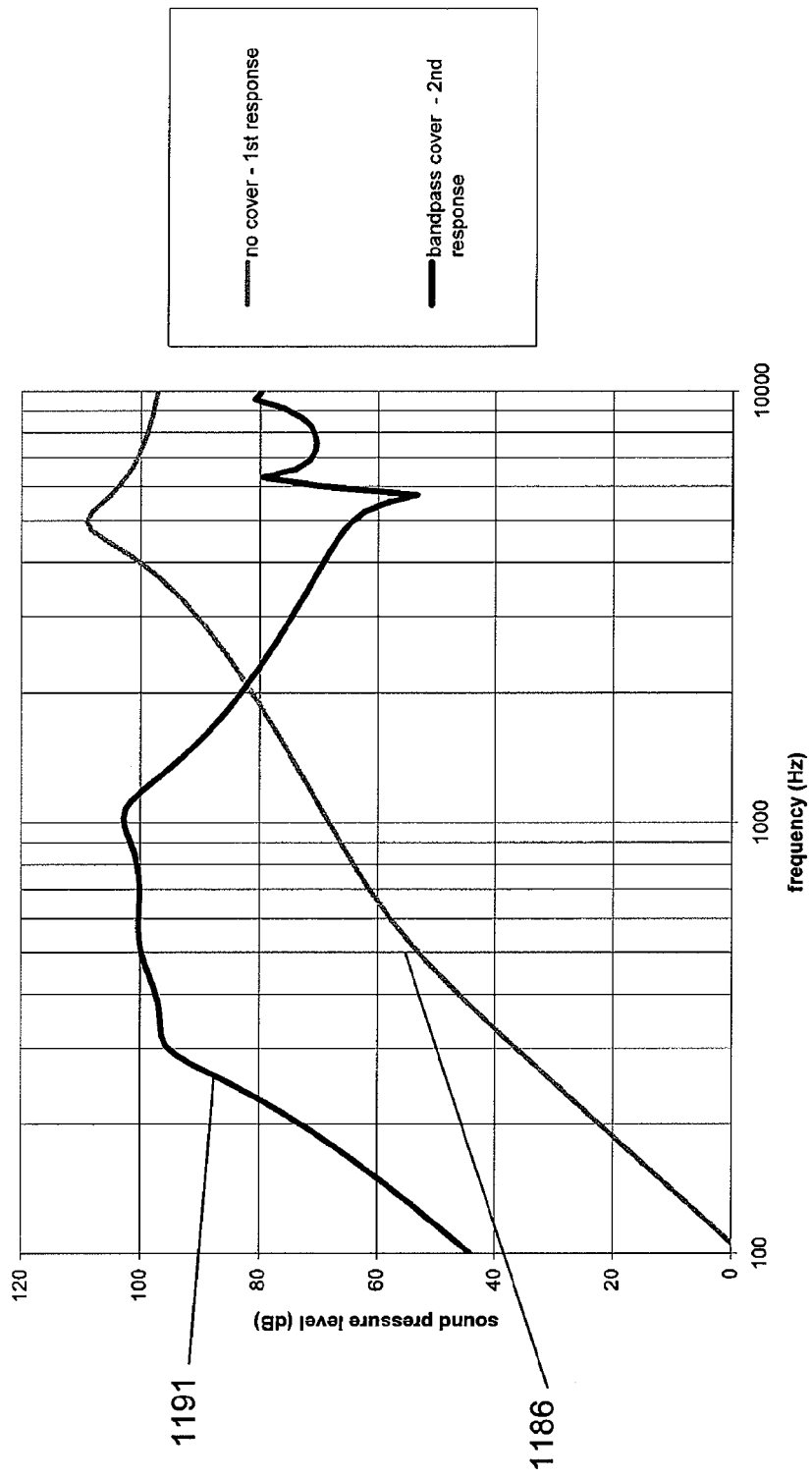
Figure 11E:
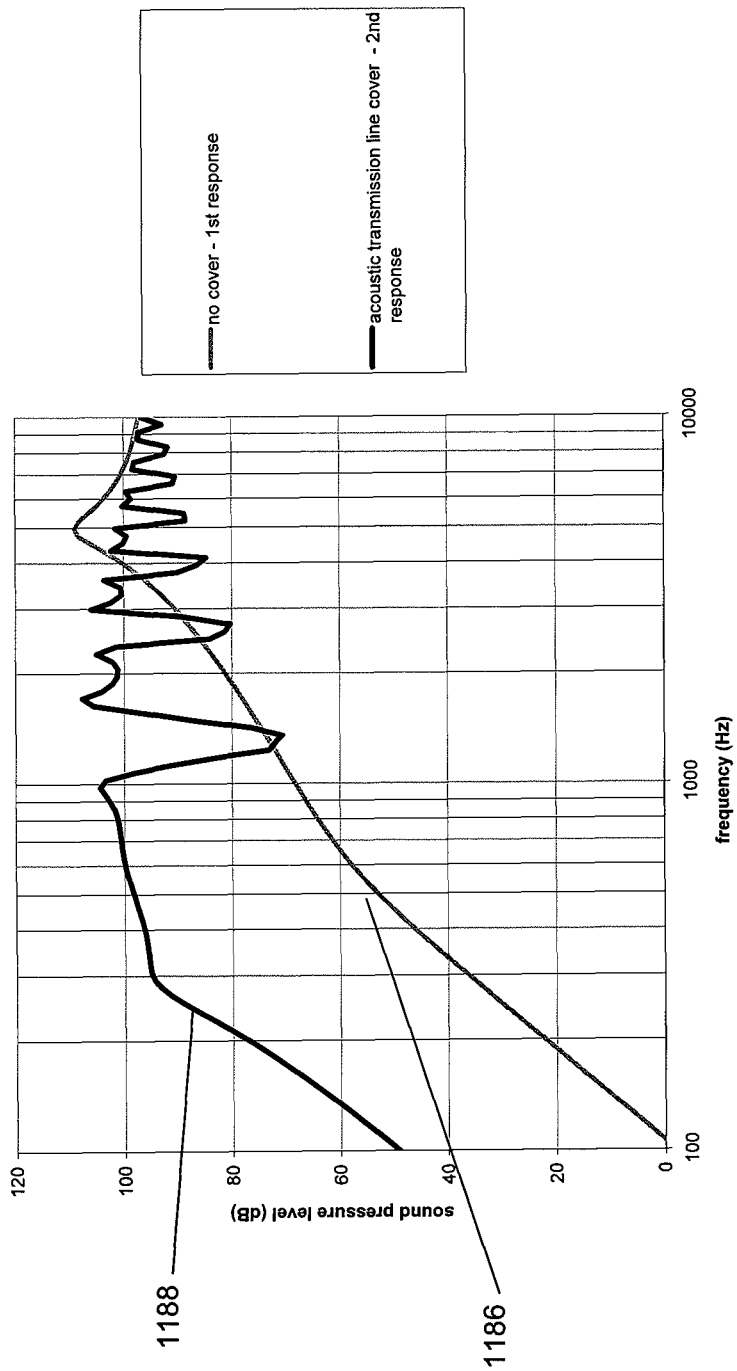

FIGS. 11a-11e are a series of graphs where the x-axis is calibrated in frequency in Hertz (Hz), and the y-axis is calibrated in sound pressure level in dB (dBSPL), that illustrates bandwidth and/or efficiency improvements for each of the disclosed quick-disconnect passive acoustic covers. FIG. 11e illustrates a transmission line embodiment of the disclosed quick-disconnect passive acoustic cover such as one of those embodiments depicted in FIGS. 5, 9 and/or 10. As discussed above, the speaker 106 (see FIG. 1) has a first side and a second side associated with a first acoustic load and a second acoustic load. The housing 104 is configured to removably receive a quick-disconnect passive acoustic cover which is configured to redefine at least one of the first acoustic load and the second acoustic load so as to replace the first system frequency response with a second system frequency response. A first frequency response 1186 is illustrated as having a rising frequency response with less low frequency output than a second frequency response 1188 associated with the transmission line embodiment. The second frequency response 1188 may replace the first frequency response 1186 of a device 102 (see FIG. 1), when the disclosed quick-disconnect passive acoustic cover such as cover 550, 990 and/or 1000 is removably attached to device 102. FIGS. 11a-11e illustrate the second frequency responses for the system when each of the disclosed quick-disconnect passive acoustic covers are attached to device 102. The second frequency responses for each embodiment are as follows: a standard sealed cover 1187 (FIG. 11a), an acoustic suspension cover 1189 (FIG. 11b), a bass reflex cover 1190 (FIG. 11c), a bandpass cover 1191 (FIG. 11d), and an acoustic transmission line cover 1188 (FIG. 11e).

The disclosed portable audio device includes a housing and a speaker supported by the housing wherein the speaker and housing have a first system frequency response. The speaker of the disclosed portable audio device has a first side and a second side associated a first audio port and a second audio port, in turn associated with a first acoustic load and a second acoustic load. The housing is configured to removably receive the disclosed quick-disconnect passive acoustic cover which is configured to redefine at least one of the first acoustic load and the second acoustic load so as to replace the first system frequency response with a second system frequency response. That is, the quick-disconnect passive acoustic cover beneficially enhances the efficiency and/or bandwidth of a loudspeaker, which as mentioned above depends to some extent on the acoustic load placed on it by the way it is coupled to its surrounding structures.

The disclosed quick-disconnect passive acoustic cover provides one or more additional surrounding structures which in the disclosed configurations, replace the inherent frequency response of the device speaker and housing with an improved frequency response. A disclosed quick-disconnect passive acoustic cover may be easily removed and replaced, providing easy access to sound quality options to the user without increasing the size of the transducer or speaker and/or speaker cavity, or the power requirements of the sound system. Moreover, the disclosed quick-disconnect passive acoustic cover beneficially can improve the sound quality without adding any costs to the device by way of utilizing a particularly expensive speaker. Also as discussed above, different embodiments of the disclosed quick-disconnect passive acoustic cover beneficially provides a plurality of sound quality options to a user depending on their sound needs.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A portable audio device, comprising:
    a housing;
    a speaker carried by the housing, the speaker having a first side and a second side;
    a first audio port of the housing proximal to the first side of the speaker, and a second audio port proximal the second side of the speaker; and
    a quick-disconnect passive acoustic cover removably coupled to the housing, the cover including a first volume coupled to the first port and the first volume including a first aperture in the volume to provide a first tuned resonator chamber for the speaker, and the passive cover including a second volume coupled to the second port and the second volume including a second aperture to create a second tuned resonator chamber for the speaker, wherein the housing and speaker are selected to have a first system frequency response with the cover removed and a second system frequency response with the cover attached to the housing.

2. The portable audio device of claim 1 wherein the quick-disconnect passive acoustic cover, comprises:
    an acoustic input port for the second volume coupled to receive audio from the second audio port of the device housing; and
    the second volume defining an acoustic channel coupled to the at least one acoustic input port.

3. The portable audio device of claim 1 wherein at least one of the cover volumes further comprises:
    a duct-shaped volume configured to be coupled to at least one of the first audio port and the second audio port of the device housing to form a transmission line tuned to a particular frequency.

4. A quick-disconnect passive acoustic cover, comprising:
    a first acoustic input port, a first acoustic channel having at least one first aperture remote from the first input port to define a Helmholtz resonator coupled to the first input port;
    a second acoustic input, a second acoustic channel having at least one second aperture remote from the second input port to define a Helmholtz resonator coupled to the second input port wherein:
        the cover is configured to be removably attachable to a portable audio device having a speaker and including a first audio output port having a first acoustic load for the speaker and a second audio output port having a second acoustic load for the speaker, the portable audio device including the speaker having a first system frequency response;
    wherein the first acoustic input port of the cover is configured to receive audio output from the speaker through the first audio output port of the portable audio device and the second acoustic input port of the cover configured to receive audio output from the second audio output port of the portable audio device, and
    wherein the acoustic cover is configured to redefine the acoustic load so as to replace the first system frequency response with a second system frequency response when removably attached to the portable audio device.

* * * * *